United States Patent [19]

Baer

[11] Patent Number: 4,686,662
[45] Date of Patent: Aug. 11, 1987

[54] SUBAPERTURE COARSE TRACKING OPTICAL SYSTEM FOR OPTICAL DATA STORAGE DEVICES

[75] Inventor: James W. Baer, Boulder, Colo.

[73] Assignee: Storage Technology Partners II, Louisville, Colo.

[21] Appl. No.: 631,277

[22] Filed: Jul. 16, 1984

[51] Int. Cl.$^4$ .............................................. G11B 7/095
[52] U.S. Cl. ..................................... 369/44; 369/111; 369/109; 250/202
[58] Field of Search ................. 369/111, 44, 109, 110, 369/112; 250/202

[56] References Cited

U.S. PATENT DOCUMENTS

| | | | |
|---|---|---|---|
| 3,876,841 | 4/1975 | Kramer | 369/112 |
| 3,959,581 | 5/1976 | Laub | 369/112 |
| 3,983,317 | 9/1976 | Glorioso | 369/112 |
| 4,085,423 | 4/1978 | Tsunoda | 369/112 |
| 4,157,568 | 6/1979 | Okki | 369/111 |
| 4,165,519 | 8/1979 | Gota | 369/112 |
| 4,322,838 | 3/1982 | Neumann | 369/112 |

*Primary Examiner*—Alan Faber
*Attorney, Agent, or Firm*—Woodcock Washburn Kurtz Mackiewicz & Norris

[57] ABSTRACT

A subaperture optical system for preventing interference between light inadvertently reflected from the protective overcoat of an optical recording disk from disruptively interfering with light reflected from the active layer of the optical recording disk, thereby causing coarse servo tracking errors as the coarse servo actuator carriage translates over the coarse servo tracks on the disk service. The optical system is comprised of a laser light source, a collimating lens system, an astigmatizing lens system, a subaperture mirror, a carriage actuator, a beam relaying telescope, an objective lens, an objective lens focus actuator, a reflected coarse servo beam focusing lens, and a coarse servo detector. The laser issues a beam which follows a first subaperture path that is parallel to, but off center from, the optical axis of an objective lens of the optical system. The beam is formed into a line focused spot which is focused on the disk surface at a non normal angle. The beam reflected by the active layer and the protective overcoat are spatially separated, and therefore do not interfere. The reflected beams follow a second subaperture path to the coarse servo detector, where the reflected signal is detected unaffected by any interference between the reflected beams.

4 Claims, 8 Drawing Figures

SUBAPERTURE COARSE TRACKING OPTICAL SYSTEM FOR OPTICAL DATA STORAGE DEVICES

BACKGROUND OF THE INVENTION

The disclosed invention relates to the field of the optical beam manipulation in optical disk storage devices, and in particular to preventing undesirable reflections from the disk surface from interfering with the proper detection of the coarse servo tracking signal reflected from the disk surface.

In optical storage, information is stored on media which generally consists of a reflecting substrate, a phase layer, an active layer, and a protective overcoat. A protective overcoat is used because the active layer is generally rather fragile and easily damaged. In some devices, the protective overcoat also serves as a dust defocusing layer. The information is initially recorded as changes in reflectivity between the "marked" and the "unmarked" regions of the media. The unreflective region exists as a result of destructive interference between the incident beam reflected at the active layer and the beam reflected off of the substrate. When an optical hole is created in the active layer, no light is reflected at the active layer, so that the light reflected by the substrate returns through the system with out interference, causing a bright "spot" to be detected.

It is well known in the art to use a focused radiation beam, usually a laser, to record and read both digital and analog information on such a recording media. With such focused beams, the light is generally focused to as small a spot as feasible in order to store data as densely as possible on the recording surface. In rotating disk storage devices, information is stored in either concentric or spiral recording tracks. For proper device operation, the light beam must be properly focused on the disk surface. The focused beam must be properly tracked across the disk surface. There have been a number of different methods taught for properly focusing the beams on the disk surface, all requiring a tightly focused spot on the disk media.

Likewise, tracking of the device beams over the disk surface has generally followed well known techniques. For fine tracking of the focused beam over the disk surface, prior devices have taught the focusing of a pair of tracking spots on opposite edges of a data track on the disk surface, and comparing the strength of the reflected signals. Thus, tracking also requires tightly focused spots.

However, in random access devices using disk shaped carriers, it has generally been necessary to provide for the gross (coarse) translation of the optical elements over the disk surface from one area of the disk to another. The coarse translation of the beams over the disk surface has generally been accomplished by mounting some portion of the optics in a carriage actuator, and moving the carriage actuator over the disk surface to the area to be read or written. Relatively widely spaced coarse servo tracks are then used to determine actuator and optical element position as the actuator moves across the disk surface. To detect these relatively wide spaced tracks, a broad spot is generally preferred.

Because two fundamentally differnt types of spots are needed at the disk surface, there has been increased interest in the use of multi-laser systems. The first laser is used to supply the coarse servo beam. The second laser is used to supply to fine tracking focusing and data reading beam.

However, in systems having the protective overcoats, unwanted reflections from the protective overcoat can create signal detection problems. The beam reflected from the protective layer can interfere with the beam reflected from the active layer. Since the protective overcoat will vary slightly in thickness, the phase difference between the light reflected from the active layer and the light reflected from the protective overcoat will also vary as a beam is translated over the disk surface. Sometimes the beams reflected from the protective overcoat will constructively interfere with the beams reflected from the active layer, and sometimes the beams reflected from the protective layer will destructively interfere. This random variation in interference can result in serious signal detection problems.

Both the read beams and the coarse servo beams have some portion of their light reflected by the protective overcoat. However, the read beams are focused onto the disk active layer in diffraction limited spots. With a diffraction limited spot, a beam reflected from the protective overcoat will have a different radii of curvature than one reflected from the active layer, so the constructive and destructive interferences tend to cancel out at the detector, not severely effecting the read beam signal sensed by the read detectors.

However, because the coarse servo beam is focused on the disk surface as a broad spot in at least one of its optical axes, the radius of curvature of that portion of the coarse servo beam reflected from the protective layer will much more closely match that of a beam reflected from the active layer, so that the respective constructive and destructive interferences can result in unreliable coarse servo signals falling on the coarse servo detectors.

What is needed then is a means for efficiently and completely preventing light reflected from the protective overcoat from interfering with light reflected from the active layer. The present invention discloses such a means. The present invention discloses a subaperture coarse servo optical system, wherein the coarse servo beam can be efficiently reflected from the disk so that reflection from the protective overcoat does not interfere with the proper detection of the coarse servo beam.

It is an object of the disclosed invention to provide a system for delivering a coarse servo optical beam in a random access optical disk storage unit.

It is another object of the disclosed invention to provide a coarse servo optical beam which does not create undesirable interference between beams reflected from the various interfaces of the optical recording media.

It is yet another object of the disclosed invention to provide a means for preventing undesired interference between the coarse servo beams reflected from the media protective overcoat and those reflected from the active layer.

BRIEF SUMMARY OF THE INVENTION

The present invention discloses a means for selectively preventing coarse servo light reflected from the protective overcoat of an optical information storage disk from interfering with the proper detection of the coarse servo beam. The disclosed invention provides a means whereby the coarse servo beams reflected from the media active layer and those reflected from the media protective overcoat follow a spatially separated optical paths, but still share common optical elements.

Thus, the two reflected beams do not interfere with one another and thereby altering the amplitude of the total signal reflected from the disk surface.

The invention is comprised of: a laser light source, a collimating lens systems, a subaperture mirror, a carriage actuator, a beam relaying telescope, an objective lens, an objective lens focus actuator, a reflected coarse servo beam focusing lens, and a coarse servo detector. The laser emits a beam which follows a first subaperture path that is parallel to, but off center from, the optical axis of the object lens of the optical system. The coarse servo beam passes through a collimating lens system, which collimates the beam emitted by the laser. The incident coarse servo beam then passes through a cylindrical lens which astigmatizes the beam.

The collimated incident coarse servo beam then impinges upon the subaperture mirror. In the preferred embodiment, the subaperture mirror is positioned in a first subaperture path, so that the incident beam impinges upon, and is deflected by, the subaperture mirror, but will allow a beam in a second subaperture region to pass undeflected.

The incident coarse servo beam then enters the carriage actuator. In the preferred embodiment, the carriage actuator contains the beam relaying telescope, the objective lens and the objective lens focus actuator. The incident coarse servo beam passes through the first subaperture of the lenses in the beam relaying telescope and the objective lens respectively. The objective lens is positioned by the read optics and the focus actuator to focus the coarse servo beam on the active layer. The coarse servo optical system is arranged so that a radially oriented line focused beam falls on the disk surface. However, because the coarse servo beam is transmitted through the off center axis subaperture of the system, the coarse servo beam strikes the media at a non-normal angle. Coarse servo beam is still reflected from both the active layer and the protective overcoat. However, because the beam is incident on the detector at a non-normal angle, the reflected beams are spatially separated and thus do not interfere.

The reflected coarse servo beams pass back through the the objective lens, and beam relaying telescope lenses. The beams pass undeflected under the subaperture mirror, and pass through the coarse servo focusing lens, which focuses the reflected coarse servo beams on the coarse servo detector. All coarse servo beams reflected from the disk surface are focused on the coarse servo detector. However, since they are spatially separated, they do not improperly interfere with one another. Consequently, as the coarse servo beam tracks over the the coarse servo track, no variation in the signal due to interference between the two reflected beams is generated.

DETAILED DESCRIPTION OF THE PREFERRED EMBODIMENT

Figure 1:
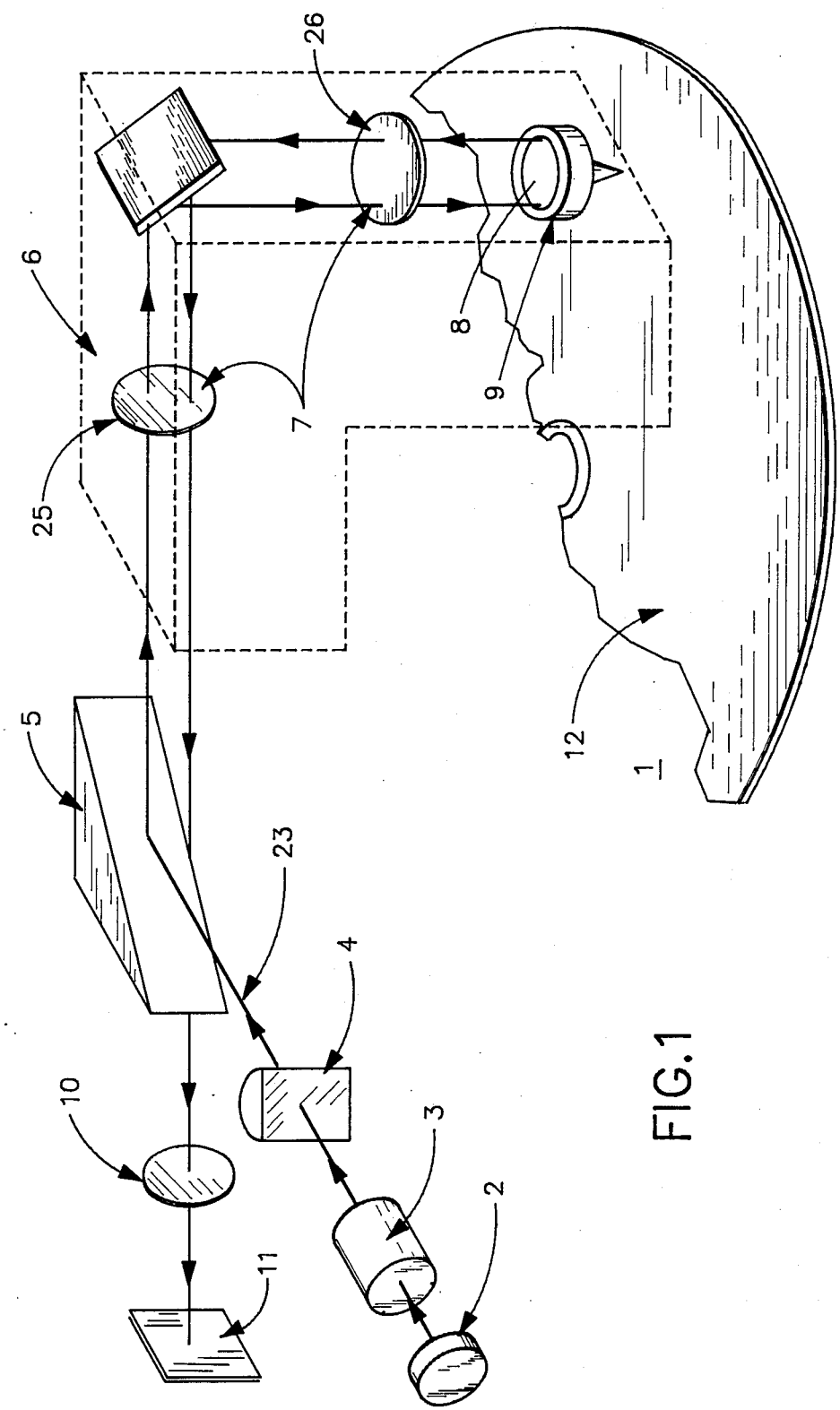
FIG. 1 is a perspective representation of the coarse servo optical system.

As shown in FIG. 1, the disclosed invention, a subaperture coarse servo system 1 for an optical disk storage device, is comprised of: a laser light source 2, a collimating lens system 3, an astigmatizing lens 4 for forming a line focused beam on the disk surface, a subaperture mirror 5, a carriage actuator 6, a beam relaying telescope 7, an objective lens 8, an objective lens focus actuator 9, a reflected coarse servo beam focusing lens 10, and a coarse servo detector 11.

Figure 2:
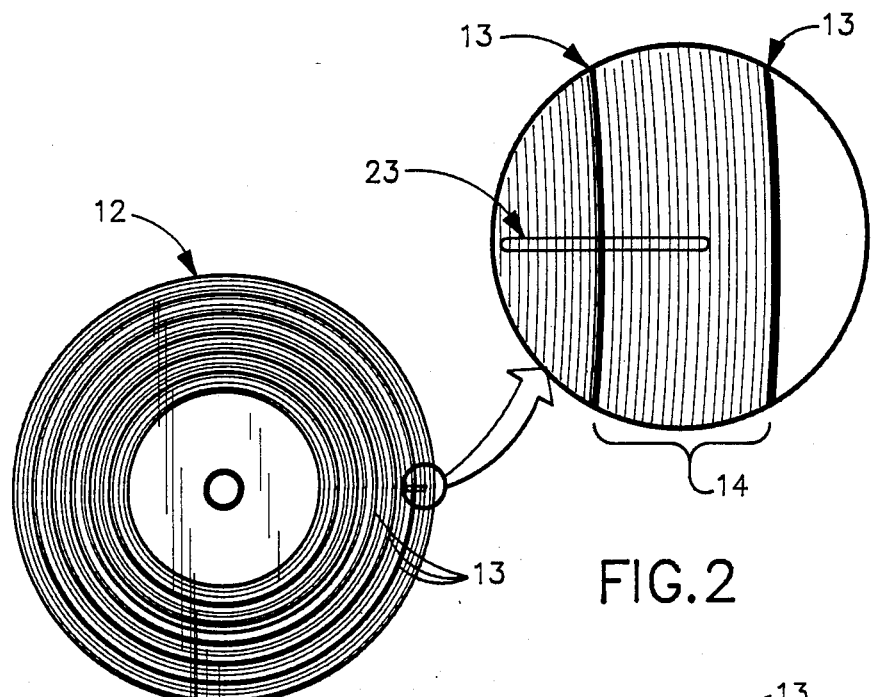
FIG. 2 is a pictorial representation of an optical disk successively showing a plurality of coarse servo tracks located on the disk surface, the data recording tracks located between the coarse servo tracks, and the coarse servo beam focused across a single coarse servo track.
Figures 3, 4:
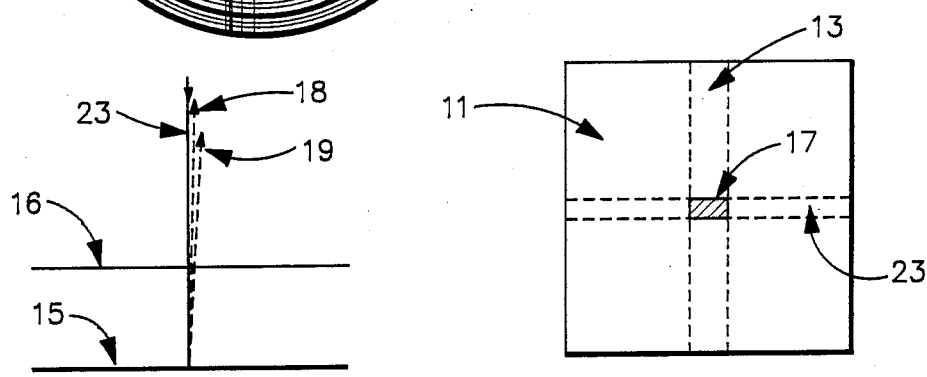
FIG. 3 is a pictorial representation showing a coarse servo beam reflected from the disk media, illustrating the interference between that portion of the incident beam reflected from the active layer and that portion reflected from the protective overcoat.
FIG. 4 is a pictorial representation of the coarse servo detector showing the image focused on said detector.

As shown in FIG. 2, in the optical storage device for which the coarse servo subaperture system is contemplated for use, the rotating optical storage disk 12 has a plurality of coarse servo tracks 13, between which user data is to be written on user data tracks 14. As shown in FIG. 3, in the contemplated system 1, the disk 12 media has an active layer 15 and a protective overcoat 16 which are of interest.

As shown in FIG. 4, in a properly operating system not having any undesired reflected beams from the disk 2 surface, an example reflected coarse servo spot 17 would impinge upon the coarse servo detector 11. When a coarse servo beam, is correctly centered over a coarse servo track 13, a null signal is generated by the detector 11. However, when a coarse servo beam is not centered over the coarse servo track 13, a position error signal is generated by the detector 11, which is sent to a servo control device (not shown), which in turn drives the carriage actuator 6 in the direction appropriate for proper centering over the coarse servo track 13.

Figure 5:
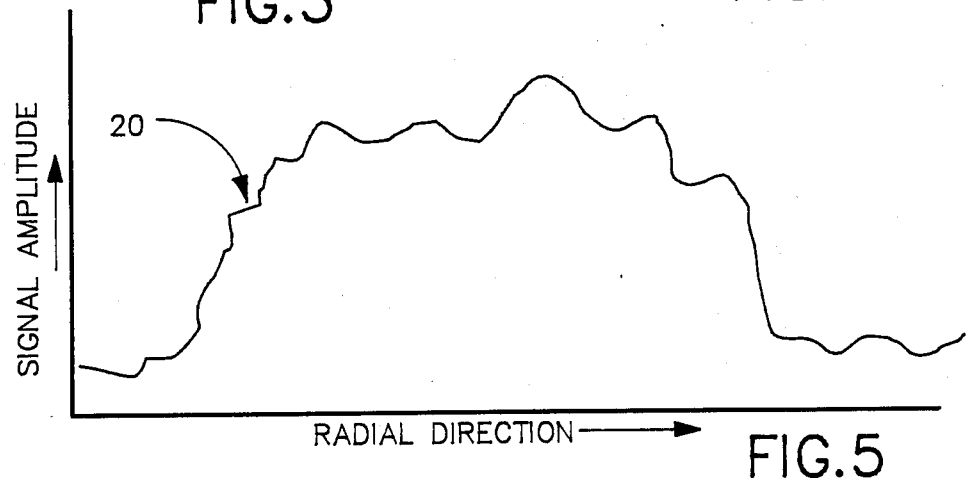
FIG. 5 is a diagram charting the signal response as the coarse servo detector as the coarse servo beam tracks over a coarse servo band, particularly showing the noise generated by the constructive and destructive interference between the reflected active layer and reflected protective layer beam.

However, as shown in FIG. 5, when there is random interference between a beam 18 reflected from the active layer 15 of the disk 12 surface and a beam 19 reflected from the protective overcoat 16 of the disk 12, a signal 20 of randomly varying amplitude is received by the detector 11.

Figure 6:
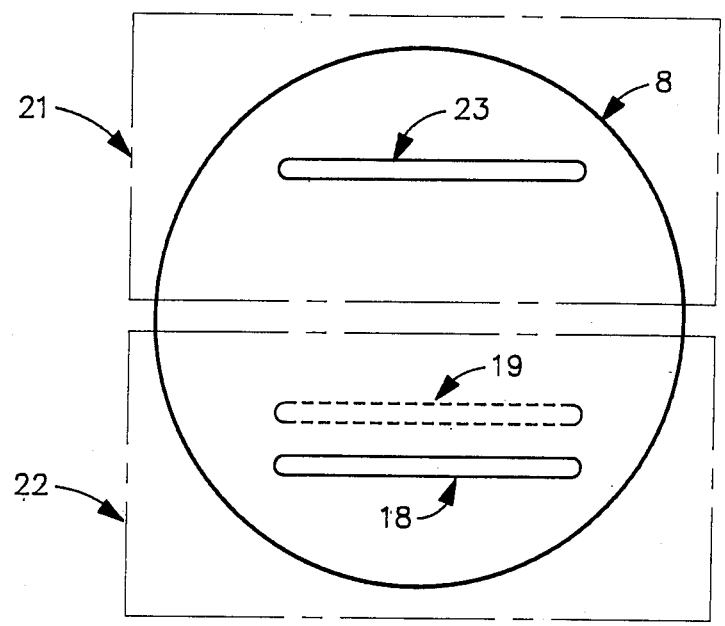
FIG. 6 is top view of the objective lens showing the first and second subaperture regions of the system, and the incident and reflected beams propagating through the first and second subaperture regions.
Figure 7:
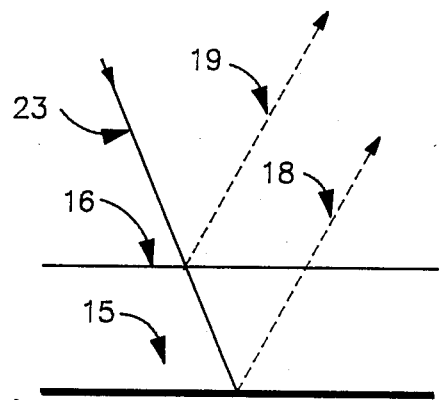
FIG. 7 is a pictorial representation showing a coarse servo beam arriving at the disk surface from the first subaperture region, one portion of the beam being reflected from the protective overcoat following a first return path and a second portion of the beam reflected from the active layer following a second return path both propagating in the second subaperture region.

As shown in FIG. 6, the optical system has a first subaperture optical region 21 which includes the upper portion of the objective lens 8 aperture and a second subaperture region 22 which includes the lower portion of the objective lens 8 aperture. Any beam whose entire bundle of rays travel only in a given subaperture region is said to follow that subaperture path. As shown in FIGS. 1, 6 and 7, the incident 23 and reflected beams 18 and 19 pass through the objective lens 8, the incident coarse servo beam 23 emitted by the laser 2 follows a path through a first subaperture region 21 of the device optical system 1.

As shown in FIG. 1, in the preferred embodiment, the laser 2 is positioned such that the coarse servo beam emitted by the laser follows a first path that is parallel to, but off center from, the system optical axis. Since some lasers emit diverging beams, in the preferred embodiment, the collimating lens system 3 is included to provide a collimated beam 23 for passage through the coarse servo optical system 1. The coarse servo beam 23 then passes through an astigmatizing cylindrical lens 4. The incident coarse servo beam 23 is astigmatized so that a radial line focused beam (not shown) falls on the disk 12 surface. Upon exiting the cylindrical lens 4, the collimated coarse servo beam 23 then impinges upon the subaperture mirror 5.

In the preferred embodiment, the subaperture mirror 5 is positioned in the first subaperture region 21, so that the incident coarse servo beam 23 impinges upon, and is deflected by, the subaperture mirror 5 toward the objective lens carriage actuator 6.

As discussed above, the coarse servo movement across the disk 12 surface is controlled by the carriage actuator 6. In the preferred embodiment, the carriage actuator 6 contains the beam relaying telescope 7, the objective lens 8 and the objective lens focus actuator 9, which all move as a unit. In the preferred embodiment, the beam relaying telescope 7 is comprised of two infinite conjugate lens 25 and 26. As Shown in FIG. 6, since the incident coarse servo beam 23 cross section is narrow, only the upper "subaperture" of the beam relaying telescope lens 25 and 26, and the objective lens 8 are used by the incident coarse servo beam 23.

The objective lens 8, is mounted in an objective lens focus actuator 9, which translates the objective lens 8 in a direction normal to the disk 12 surface in response to a signal form servo control means (not shown). In the preferred embodiment, a voice coil motor is used, and the objective lens is a compound spherical lens.

As Shown in FIGS. 1 and 7, the objective lens 8 is positioned by the focus actuator 9 to focus the incident coarse servo beam 23 on the active layer 15. However, because the incident coarse servo beam 23 is transmitted through the off axis first subaperture region 21 of the system 1, the incident coarse servo beam 23 strikes the active layer 15 and the protective overcoat 16, at a non-normal angle.

As shown in FIG. 7, light is still reflected from both the active layer 15 and the protective overcoat 16. However, because the incident coarse seek beam 23 is incident on the disk 12 at a non-normal angle, the reflected beams 18 and 19 are now spatially separated. This spatial separation prevents the beam 19 reflected from the protective overcoat 16 from either constructively or destructively interfering with the beam 18 reflected from the active layer 15.

As shown in FIGS. 6 and 7, the reflected active layer and protective overcoat beams 18 and 19 pass back through the system 1, passing through the lower subaperture 22 of the objective lens 8, and beam relaying telescope lenses 25 and 26.

As shown in FIG. 1, the subaperture mirror 5 is positioned only in the first subaperture region 21, so that only light traveling in the first subaperture path will be deflected by the subaperture mirror 5. Therefore, because the reflected beams 18 and 19 are propagating through the second subaperture region 22, the beams 18 and 19 pass undeflected under the subaperture mirror 8. It can thus be seen that this subaperture optical system 1 can also act as a beam splitter, splitting an incident beam from the reflected beam.

Figure 8:
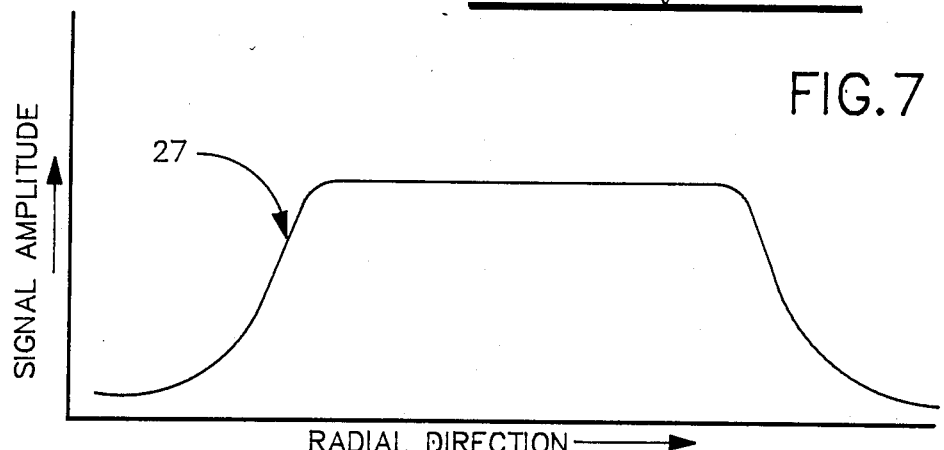
FIG. 8 is a pictorial representation showing the coarse servo beam reflected from the disk media, illustrating the signal received by the coarse servo detector when the beams reflected from the active layer and the protective overcoat do not interfere.

The undeflected coarse servo beams 18 and 19 then impinge on the coarse servo focusing lens 10, which focuses the reflected coarse servo beams 18 and 19 on the coarse servo detector 11. In the preferred embodiment, the coarse servo detector 11 is a one dimensional, position sensing, detector. Because both of the beams 18 and 19 reflected from the active layer 15 and the protective overcoat 16 respectively are collimated when incident on the coarse servo focusing lens 10 and are following parallel paths, both beams 18 and 19 are focuses on the coarse servo detector 11. However, the beam 19 reflected from the protective overcoat 16 does not interfering with the beam 18 reflected from the active layer 15, because of the spatial separation. Therefore, as shown in FIG. 8, as the coarse servo beam 23 tracks over the the coarse servo track 13, no variation in the signal 27 received by the coarse servo detector 11 is generated as a result of reflective interference between the beams 18 and 19 reflected from the active and the protective layers 15 and 16.

What is claimed is:

1. An optical system for preventing light reflected by a protective layer on an optical recording structure, in an optical disk information storage unit having coarse servo tracking, from, interfering with light reflected from an active layer of the optical disk recording structure, said optical system comprised of;
    a means for emitting a collimated, coherent coarse servo light beam so as to emit a beam along a first optical path parallel to but off-center from the optical axis of an objective lens;
    a means for expanding one optical axis of the incident light beam so as to form a line focus beam on the disk surface;
    a means for spatially separating the beams reflected from the protective layer and the active layer;
    a means for splitting the incident beam from any beams reflected from the disk surface.
    a means for translating the coarse servo beam over the disk surface for coarse servo tracking;
    a means for relaying the coarse beam to the coarse servo translating means;
    an objective lens for focusing the coarse servo beam on the disk surface,;
    a means for focusing any beams reflected from the disk surface onto a coarse serve detector, and;
    a coarse servo beam detector.

2. An interference preventing optical system as recited in claim 1, wherein, the means for emitting a collimated, coherent light beam is comprised of:
    a laser, said laser emitting a coherent coarse servo light beam, and;
    a collimating lens system, said collimating lens system receiving the light from the laser and completely collimating the coarse servo light beam.

3. An interference preventing optical system as recited in claim 2, wherein the means for spatially separating the beams reflected from the protective layer and the active layer is comprised of:
    the laser further positioned so as to emit an incident coarse serve beam which propogates along a first path in the first subaperture region of the system, parallel to but off-center from the optical axis of the objective lens, and;

a subaperture mirror positioned in the path of the incident light beam so as to deflect the incident beam toward the objective lens, and;

the objective lens positioned so as to receive the incident beam propagating in the first subaperture region and focusing same on the disk surface, receiving any reflected beam and collimating same for propagation back through a second subaperture region of the system;

4. An interference preventing optical system as recited in claim 3, wherein the means for splitting the incident beam from any beams reflected from the disk surface is comprised of the subaperture mirror further positioned in the path of the incident light beam so as to deflect the incident beam toward the objective lens, but further positioned out of a second, return path so that any reflected coarse servo beam are undeflected by the subaperture mirror.

* * * * *